No. 687,850. Patented Dec. 3, 1901.
K. NELSON.
ADJUSTING DEVICE FOR CAMERAS.
(Application filed Sept. 9, 1901.)
(No Model.) 2 Sheets—Sheet 1.

Witnesses.
G. S. Noble
C. A. Adams

Inventor.
Knud Nelson:
By Charles Turner Brown, Att'y.

No. 687,850. Patented Dec. 3, 1901.
K. NELSON.
ADJUSTING DEVICE FOR CAMERAS.
(Application filed Sept. 9, 1901.)
(No Model.) 2 Sheets—Sheet 2.
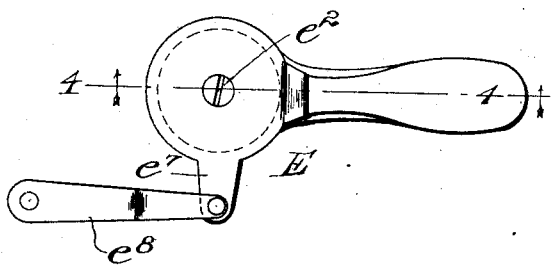
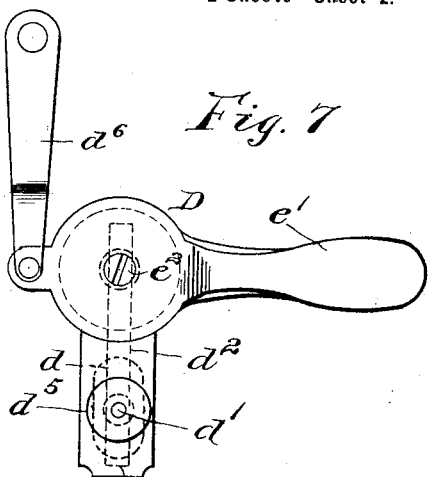
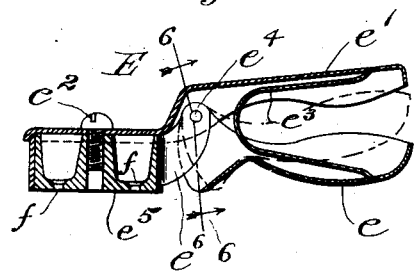
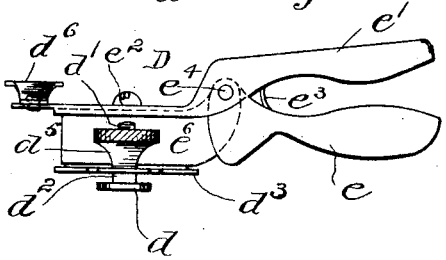
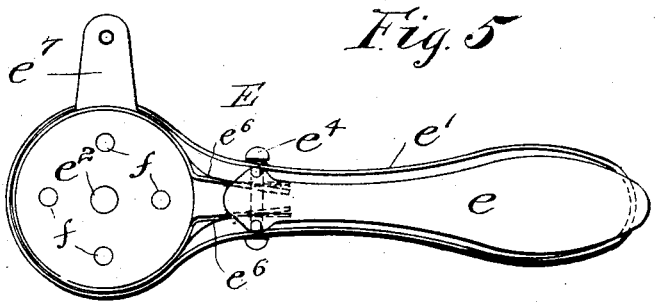
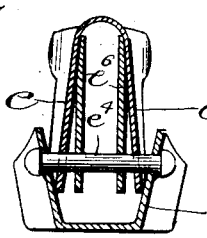
Witnesses.
G. S. Noble
C. A. Adams
Inventor.
Knud Nelson
By Charles Turner Brown
Att'y.

UNITED STATES PATENT OFFICE.

KNUD NELSON, OF CHICAGO, ILLINOIS.

ADJUSTING DEVICE FOR CAMERAS.

SPECIFICATION forming part of Letters Patent No. 687,850, dated December 3, 1901.

Application filed September 9, 1901. Serial No. 74,774. (No model.)

*To all whom it may concern:*

Be it known that I, KNUD NELSON, a citizen of the United States, and a resident of Chicago, in the county of Cook and State of Illinois, have invented certain new and useful Improvements in Adjusting Devices for Cameras, of which the following, when taken in connection with the drawings accompanying and forming a part hereof, is a full and complete description sufficient to enable those skilled in the art to which it pertains to understand, make, and use the same.

This invention relates to photographic cameras having focal adjustment of the plate-holder and also having tilting and swinging adjustments of such plate-holder.

The object of this invention is to obtain a photographic camera of the kind described wherein all of the several adjustments named may be made with ease and accuracy and such adjustments will be automatically maintained.

Figure 1:
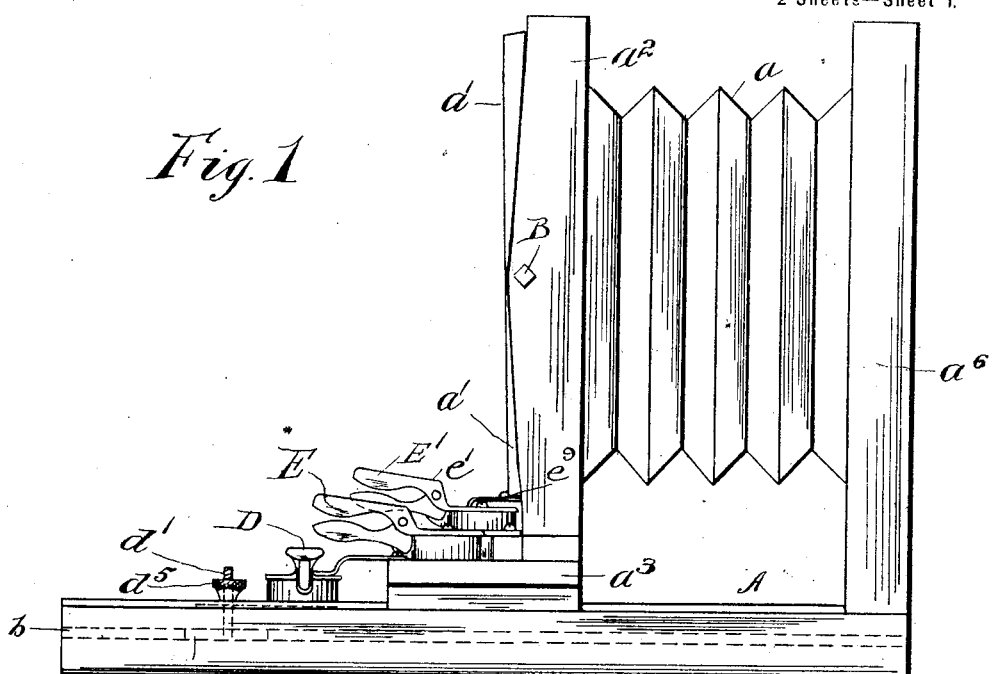
Figure 2:
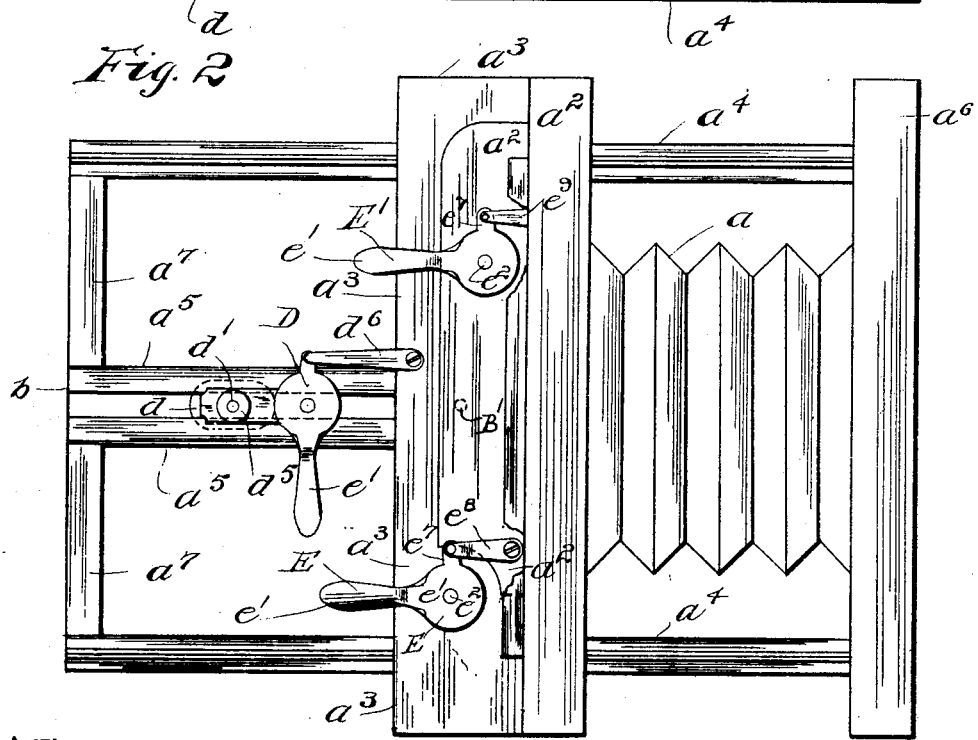

In the drawings referred to as accompanying and forming a part of this specification, Figure 1 is a side elevation of a camera embodying my invention; Fig. 2, a top plan view thereof. Fig. 3 is a top plan view of an adjusting mechanism controlling the tilting and swinging movement, respectively, of the plate-holder of the camera; Fig. 4, a vertical sectional view on line 4 4 of Fig. 3 viewed in the direction indicated by the arrows; Fig. 5, a bottom plan view thereof, and Fig. 6 a transverse sectional view on line 6 6 of Fig. 4 viewed in the direction indicated by the arrows and turned over into the position of such parts shown in Fig. 5. Fig. 7 is a top plan view, and Fig. 8 a side elevation, of the adjusting mechanism controlling the sliding movement of the plate-holder of the camera.

A reference-letter applied to designate a given part is used to indicate such part throughout the several figures of the drawings.

A is the camera. $a$ is the bellows thereof; $a'$, the plate-holder; $a^2$, the frame of plate-holder $a'$, and $a^3$ $a^3$ the base of frame $a^2$.

$a^4$ $a^4$ and $a^5$ $a^5$ are longitudinally-extending slideways, on which base $a^3$ moves in obtaining the focal adjustment of the camera, such slideways being attached at one end to head $a^6$ and at the other end being connected together by tie-piece $a^7$. The forward end of bellows $a$ is attached to head $a^6$ in the ordinary way of camera construction, such head $a^6$ being also provided with the usual means for attaching lenses thereto. The plate-holder $a'$ is pivotally secured in frame $a^2$ by pivot or bolt B, and frame $a^2$ is pivotally connected to base $a^3$ by pivot or bolt B'. The plate-holder $a'$ may thus be tilted on bolt B in the ordinary way of camera construction, and such plate-holder $a'$, together with frame $a^2$, may be swung on pivot or bolt B', also in the ordinary way of camera construction.

$b$ $b$ are grooves (indicated by broken lines in Figs. 1 and 2) in slideways $a^5$ $a^5$.

D, E, and E' are adjusting mechanisms particularly embodying in themselves and in their connection to the camera my invention. D is the adjusting mechanism by means of which the exact position of base $a^3$ on slideways $a^4$ $a^4$ and $a^5$ $a^5$ is determined and maintained. E is the adjusting mechanism by which the swinging of frame $a^2$ on base $a^3$ is determined, and E' is the mechanism by means of which the tilting of the plate-holder $a'$ in frame $a^2$ is determined. Adjusting mechanisms E and E' are duplicates and are referred to by distinctive lettering merely for convenience with reference to the parts attached thereto, respectively, and hence a description of adjusting mechanism E as the same is illustrated in Figs. 3, 4, 5, and 6 of the drawings is also a description of the adjusting mechanism E'. The operative parts of adjusting mechanism E are placed in adjusting mechanisms D, together with additional connections required, which additional mechanisms are illustrated in Figs. 7 and 8 of the drawings.

$d$ is a base provided with bolt $d'$, rigidly attached thereto. Base $d$ fits and slides easily in grooves $b$ $b$ in slideways $a^5$ $a^5$.

$d^2$ is a plate (indicated by broken lines in Fig. 7 and shown by full lines in Fig. 8) which is attached to the under side of base $d^3$ and fits between the slideways $a^5$ $a^5$. The bolt $d'$ passes through holes in plate $d^2$ and base $d^3$, respectively, fitting loosely in such holes.

$d^5$ is a thumb-nut, provided with milled edges, fitting over bolt $d'$, and provided with screw-threads corresponding with the screw-threads on bolt $d'$.

By the means last above described base $d^3$ may be slid on the slideways $a^5$ when nut $d^5$ is loose and maintained in a determined position on such slideways when nut $d^5$ is "set"—that is, turned tightly on bolt $d'$ against base $d^3$. Base $e^5$ of adjusting mechanism D (hereinafter described and common to adjusting mechanisms D, E, and E') is rigidly attached to base $d^3$ to form a circular abutment thereto.

The pivoted handle-bar $e'$ of the adjusting mechanism D is connected to the base $a^3$ by link $d^6$.

The operative parts of the several adjusting mechanisms D, E, and E' are constructed alike and are well shown in Figs. 3, 4, 5, and 6, in which $e$ is a handle pivotally attached to handle $e'$ (such handle $e'$ turning on pivot $e^2$) by pin $e^4$ and yieldingly held opened from such handle $e'$ by spring $e^3$.

$e^5$ is the base of the adjusting mechanism, to the center of which base pivot $e^2$ is secured. The pivot $e^2$ is preferably a screw-threaded bolt.

$e^6$ is a spring surrounding base $e^5$, fitting loosely thereto, the ends of such spring approaching each other and extending upward, so that the pin $e^4$ passes therethrough. When the handle $e$ is maintained away from handle $e'$ by spring $e^3$, the U-shaped end of the handle $e$, which is adjacent to the ends of the spring $e^6$, force such ends closely together against the resiliency of spring $e^6$, so that such spring $e^6$ is fitted closely to the base $e^5$, (which is therefore preferably circular in the part thereof surrounded by the spring,) thereby preventing circular movement of handle $e$ $e'$ on pivot $e^2$.

$e^7$ is a projection of the handle $e'$, and $e^8$ is a link connecting such projection $e^7$ to frame $a^2$. Movement of the handles $e$ $e'$ around the central pivot $e^2$ may be had by grasping the handles $e$ $e'$ and forcing them together against the resiliency of spring $e^3$, thereby drawing back the U-shaped end of handle $e$ from spring $e^6$, and so permitting such spring $e^6$ to expand and become loosened from base $e^5$. The base $e^5$ is attached to base $a^3$ by screws extending through the holes $f$ of such base $e^5$.

The base of adjusting mechanism E' is attached to the base-board $a^2$ in the same way as the base $e^5$ of the last-above-described adjusting mechanism is attached to base $a^3$, and the top lever $e'$ of such adjusting mechanism E' is attached to plate-holder $a'$ by the connection $e^9$. The movement of the handles $e$ $e'$ of mechanism E' around the central pivot $e^2$ is obtained in the same manner as the movement of such handles is obtained in adjusting mechanism E, and any movement of the handles of mechanism E' produces by means of connection $e^9$ tilting of the frame $e'$ on pivot B.

To adjust the bellows $a$, the thumb-screw $d^5$ is loosened and the base $a^3$ slid by hand on the slideways $a^4$ $a^4$ $a^5$ $a^5$ into an approximately adjusted position. Thumb-screw $d^5$ is then set firmly against plate $d^3$, thereby locking such plate to the slideways $a^5$ $a^5$, as by drawing the plate $d$ and such plate $d^3$ together against the interposed portion of the rails of such slideways. The actuate adjustment of the bellows $a$ is then obtained by grasping with one hand handles $e$ $e'$ of adjusting mechanism D and forcing them together, thus loosening such handles, as above described, and permitting the turning of the same on the center $e^2$. The base $a^3$ is thus moved on the slideways by means of connection $d^6$. When adjustment is obtained, the handles $e$ $e'$ are released and automatically returned to a locked position by spring $e^3$.

To adjust the frame $a^2$ on base $a^3$—that is, to swing such frame on pivot B'—the handles $e$ and $e'$ are grasped with one hand and brought together, thereby unlocking the adjusting mechanism E and permitting movement of such handles around the center pivot $e^2$, and by means of the connection $e^8$ the frame is swung on pivot B'.

To adjust plate-holder $a'$ in frame $a^2$, the handles $e$ $e'$ of adjusting mechanism E' are grasped and forced toward each other and turned in the manner last above described with reference to adjusting mechanism E, the movement of such handles imparting movement to the plate-holder on pivot B through connection $e^9$.

The spring $e^6$ requires to be of very slight resilience and in fact may consist of a metal band of ductile sheet metal.

Having thus described my invention, what I claim as new, and desire to secure by Letters Patent, is—

1. In an adjusting mechanism for cameras and the like, the combination of a base, a spring loosely fitting around such base, a handle pivotally attached to the base, an additional handle movably attached to the first-named handle, and a spring between the handles yieldingly holding one thereof against the spring around the base, to force such last-named spring to fit closely to the base; substantially as described.

2. In an adjusting mechanism for cameras, the combination of a base, sliding ways, means to secure the base in a determined position on the sliding ways, an abutment on the base, a band loosely fitting the abutment, a handle pivotally attached to such abutment, an additional handle movably attached to the first-named handle, and a spring between the handles yieldingly holding one of such handles against the band to force such band to fit closely to the abutment; substantially as described.

3. The combination of a camera with an adjusting mechanism consisting of a base, a band loosely fitting around such base, a handle pivotally attached to the base, an additional and movable handle, a spring between the handles yieldingly holding one of the handles against the band to force such band to fit closely to the base, and a connection between the pivotally-mounted handle and the camera, and between the base and the camera: substantially as described.

KNUD NELSON.

In presence of—
   CHARLES TURNER BROWN,
   CORA A. ADAMS.